Nov. 28, 1944.     L. R. SMITH ET AL     2,363,754
FLOW REGULATING AND LIQUID DISTRIBUTING FILTER SYSTEM
Filed June 18, 1941

INVENTOR
LEVI R. SMITH &
RALPH H. YOECKEL
BY Wheeler, Wheeler & Wheeler
ATTORNEYS.

Patented Nov. 28, 1944

2,363,754

UNITED STATES PATENT OFFICE 2,363,754

FLOW REGULATING AND LIQUID DISTRIBUTING FILTER SYSTEM

Levi R. Smith and Ralph H. Yoeckel, Waukesha, Wis.

Application June 18, 1941, Serial No. 398,526

6 Claims. (Cl. 138—46)

This invention relates to improvements in flow regulating and liquid distributing systems having particular utility in the field of machine and textile lubrication.

As a primary object, the invention seeks to provide a novel and improved means for controlling fluid flow by varying the density of a compressible porous or fibrous medium. In this connection, it is a further object to provide a flow controlling device which will function with accuracy and will be uninfluenced by vibration. It is preferred that the flow controlling medium shall also function as a filter and the preferred embodiments of the invention further include means whereby fluid flow to the filtering medium may be concurrently controlled as an incident to the variation of compression on such medium.

Another important object of the invention is the provision of a filtering liquid distributing system having a main filter serving all of several branches leading, as a rule, to separate machines, subordinate filters serving the several branches individually, and regulating filters controlling the flow to individual bearings from the respective branches, the system preferably including means for automatically controlling in whole or in part the entire flow through the respective branches in accordance with the requirements of the bearings lubricated therefrom.

Other objects will be apparent to those skilled in the art upon examination of the following disclosure of the invention.

In the drawing.

Like parts are identified by the same reference characters throughout the several views.

Figures 1, 2, 3:
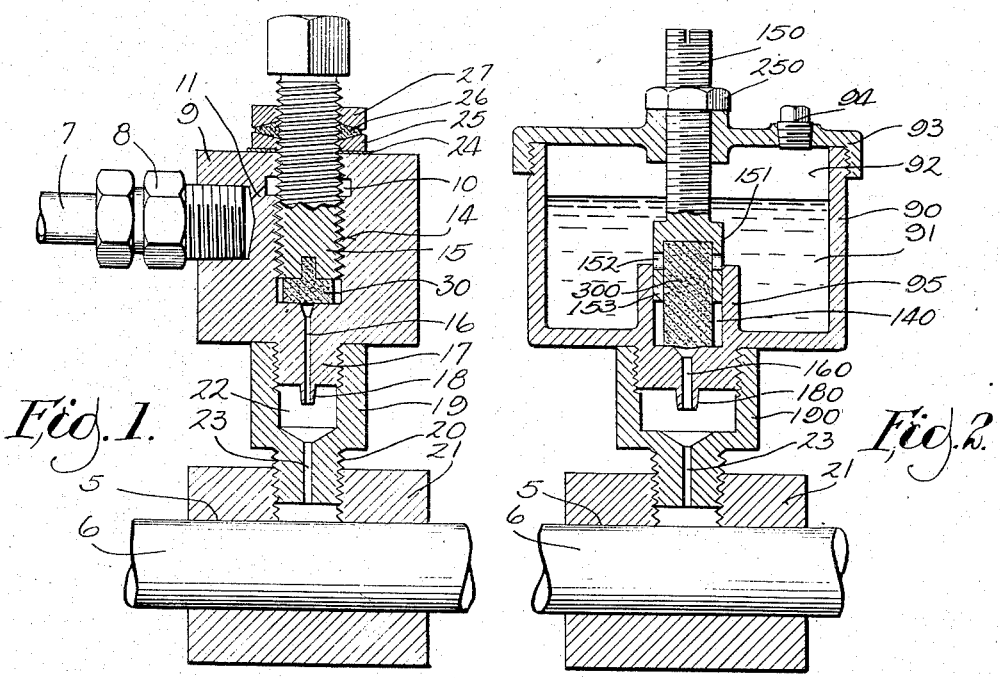
Figure 1 is a detail view in vertical section through a bearing oiler incorporating a multiple stage filter where at least one stage is subject to adjustment for flow regulation in accordance with this invention.
Figure 2 is a view similar to Figure 1 showing a modified bearing and flow regulating filter assembly.
Figure 3 is a diagram of a liquid distributing filtering and regulating system organized for the lubrication of a plurality of machines.

The device shown in Figure 1 exemplifies the invention as applied to the controlled pressure lubrication with filtered lubricant of the bearing 5 for shaft 6.

The lubricant is received through a pressure supply line 7 connected by a coupling nut 8 to a filter casing 9 having chamber 10 to which the lubricant supplied to pipe 7 is delivered through duct 11.

Intersecting the chamber 10 is a screw-threaded bore 14 in which the pressure screw 15 is loosely threaded. The duct 11 may, if desired, open directly into the bore 14, chamber 10 being unnecessary. From the bottom of the screw-threaded bore 14, a duct 16 leads downwardly through the externally threaded boss 17 and drip nozzle 18. The boss 17 is threaded tightly into the upper end of the bearing cup 19, the threaded stem 20 of which is screwed into the bearing block 21. From the interior chamber 22 of the bearing cup, duct 23 opens downwardly to the surface of the shaft 6 requiring lubrication. The bearing cup 19 is preferably made of a transparent plastic or other transparent material so that the rate of flow from the drip nozzle 18 may be checked as desired.

A gasket 24 held under compression by lock nut 25 seals the contact of the lock nut with the filter casing 9. Packing at 26 about the screw 15 is compressed between lock nut 25 and a packing nut 27, likewise threaded to the screw 15.

The threads of screw 15 are relatively loosely engaged in the threads of the filter casing 9 in bore 14. Thus, the thread spaces provide a restricted passage through which lubricant may flow under pressure from the pressure supply pipe 7 and duct 11 to that portion of bore 14 which lies below the end of screw 15. The restricted space afforded by the thread spaces acts as a primary control of rate of flow.

Maintained under compression in the bottom of bore 14 and covering the upper end of duct 16 is a body 30 of felt or other suitable compressible fibrous or porous filter material. The oil reaching the lower end of bore 14 can escape through duct 16 only by penetrating the compressible filter body 30. The rate of flow through the filter body may be regulated with great accuracy by manipulation of screw 15 upwardly or downwardly to decrease or increase the pressure to which the filter body 30 is subject. In addition to flow regulation, the filter body operates to perform its filtering function for the removal of the finest particles of foreign matter from the oil. Since the compressible flow regulating body 30 covers the delivery duct 16, fluid can reach the delivery duct only by laterally entering the body and leaving through the end thereof. When sufficient foreign matter has accumulated to restrict flow through the body or interfere with proper regulation of such flow, the body may readily be removed by simply unscrewing the pressure bolt 15, whereupon the body is exposed and may either be cleaned or replaced.

In the construction shown in Figure 2, the shaft 6 and bearing 5 may be identical with those shown in Figure 1. The invention is here exemplified in the form of a gravity oiler. The filter casing 90 is in the form of a receptacle containing a body of lubricant at 91 in its interior chamber 92. A closure 93 is not only removable but is provided with a plug at 94 through which additional lubricant may be introduced. The screw 150 is threaded through the top closure 93 of the casing and provided with a lock nut 250. No packing is required since the lubricant is not under pressure.

Projecting upwardly from the bottom of the filter casing 90 is a sleeve 95 providing interiorly a bore 140 in which the enlarged head 151 of screw 150 is guided for axial reciprocation. The head 151 has lateral openings at 152 normally exposed above the top of sleeve 95 to receive lubricant and admitted to the interior cavity 153 in which a filter body 300 in the form of a cylinder or rod is housed under compression between screw 150 and the filter casing at the bottom of bore 140.

From the bottom of the bore, and normally entirely covered by the compressed filter body 300 is a duct 160 opening downwardly through the drip nozzle 180 into the interior of the oil cup fitting 190 which is threaded into the bearing member 21 and has threaded connection with the filter casing as in the structure shown in Figure 1. The oil cup 190 may, as in Figure 1, be made of transparent material to permit free inspection of the rate of flow from the drip nozzle 180.

The same operation of screw 150 which compresses or releases the resilient porous body 300 also exposes ports 152 to a greater or lesser degree above the upper end of sleeve 95, thus effecting a primary control of the rate of flow. The location of the ports 152 at an intermediate level in the body of liquid will inherently segregrate from the liquid admitted to the filtering body any foreign matter which is either lighter or heavier than the liquid.

Further exemplifying the invention, we have shown in Figure 3 the diagram of a liquid distribution and filtering and controlling system. The invention is exemplified as applied to the lubrication of a series of machines, this being the field in which its has particular utility.

The supply tank 32 is maintained under pressure by air communicated to it through pipe 33 from pump 34.

The discharge pipe 35 from the bottom of tank 32 passes through a primary filter $F^1$ beyond which the supply line branches, the respective branches 36 and 37 being controlled by valves 38 and 39, respectively. For the purposes of the present disclosure, the organizations beyond the control valves 38 and 39 of the respective branches 36 and 37 may be assumed to be identical.

In each branch, there is a branch filter $F^2$ through which all of the liquid traversing the branch must pass. In series with this filter to control flow through the branch, is an automatic valve 40 opened by solenoid 41, the solenoid being electrically connected with the circuit to motor 42 so that the valve 40 will be open whenever the motor 42 is energized. For permitting flow through the branch when valve 40 is closed (as is normally the case when the motor 42 is deenergized), we provide a bypass valve at 43 which may be manually controlled.

The motor 42 may be understood to be the prime mover of some machine requiring lubrication. As such, it will operate a shaft or shafts 61, 62, 63 in bearing blocks 21. The shaft bearings in the respective blocks are supplied with lubricant from the branch line 36 through the individual filters $F^3$, $F^4$ and $F^5$ and supplied by pipes 71, 72 and 73, each such individual filter $F^3$, $F^4$, $F^5$ preferably corresponding identically with the corresponding disclosure of Figure 1.

Each mechanism diagrammatically illustrated may be understood to comprise one of several mechanisms to be lubricated from the main supply tank 32. Valves 38 and 39 will normally be open to permit free flow of lubricant through the branch lines 36, 37 and such additional branch lines as may be needed. The branch lines, however, are normally subject to full or partial control by the automatic valves 40 which normally open only when the motors which operate the respective mechanisms are energized. However, there are hand valves 43 permitting the bearings to be lubricated when the motors are deenergized or permitting the flow of lubricant to be increased if it is inadequate through the automatic valves 40.

In any event, all lubricant leaving the supply tank 32 is first filtered in filter $F^1$. Thereafter all lubricant passing through a particular branch line is filtered in one of the filters $F^2$ individual to such branch. Finally, all lubricant going to each individual bearing is filtered in the filter $F^3$, $F^4$ or $F^5$ individual to such bearing. At the same time, the regulation feature enables the flow to the individual bearings to be adjusted as required by manipulation of the compression screws 15 with which the compression of the filter bodies in the respective filters $F^3$, $F^4$ and $F^5$ may be varied.

In any such distribution system as that herein disclosed, whether or not it is used for lubrication, it is important not only to control individually and automatically the flow through the several branches of the system, but also to regulate flow through the several delivery pipes of each branch. By the present invention, such regulation of flow through the individual delivery pipes is controlled at the same time the delivery is filtered.

While the invention has been disclosed in an embodiment having to do with the lubrication and the distribution of a filtered lubricant to a series of machines, it will be apparent to those skilled in the art that the distribution, filtration and control of the liquid in accordance with the invention herein disclosed has a wider field of utility than lubrication and the disclosure is, therefore, to be taken merely as an exemplification of the invention.

On the other hand, the invention has particular utility as a lubricator. It also has utility both in the field of lubrication and elsewhere where near accurate control of the rate of flow of the liquid is the primary objective. The preliminary filtration provided in the apparatus and system here disclosed tends to protect the compressible porous body from becoming clogged by foreign matter and ordinarily, by the time the liquid to be controlled reaches such body, very little, if any, foreign matter is present. The body will, therefore, function over long periods of time with great accuracy to control flow and when flow is reduced by accumulations of foreign matter, the compressible control or filter body is almost instantly replaceable.

The rate of flow through a duct controlled by a compressible body as herein disclosed is almost entirely independent of vibration. In this respect, the flow control differs from practically any other device used for the purpose. This feature makes the device particularly valuable where it is desired that flow continue at a constant rate in an organization where the regulating device is subject, part of the time, to vibration and at other times is relatively free of vibration.

In addition to the field of lubrication of machines and machine parts, the invention has particular utility in the lubrication of threads and yarn in the textile industry.

We claim:

1. In an oiler, the combination with a casing having a screw threaded bore and a duct leading from the end thereof and a lubricant supply duct leading laterally thereto, of a screw loosely threaded in said bore between said supply duct and the duct first mentioned, the threads of the screw and the casing providing a preliminary control of lubricant flow, and a compressible filter body confined between said screw and the end of said bore in the path of lubricant passing from said bore to said delivery duct.

2. A flow controlling device comprising the combination with a casing having an inlet, an outlet, and conduit means between the inlet and outlet including a chamber having a screw threaded wall portion, and duct means leading from the end of the chamber, a screw loosely threaded to the threaded wall portion of the chamber, the threads of the screw and the chamber providing a liquid passage through said conduit, an elongated felted fibrous body confined between the screw and the end of the chamber covering said duct means and of sufficiently smaller cross section than the portion of the chamber in which it is located so that it has side surfaces exposed to receive from said chamber liquid which has traversed the screw threaded passage from said inlet, whereby liquid preliminarily restricted and filtered by traversing said screw thread passage enters side surface portions of said body and leaves said body longitudinally at a rate of flow controlled by the compression of the body.

3. A flow controlling device comprising the combination with a casing having an inlet, an outlet, and conduit means between the inlet and outlet including a chamber of materially greater cross section than the outlet, of an adjusting screw mounted in the casing and extending into said chamber toward said outlet, and a felted fibrous body of larger cross section than the outlet and smaller cross section than said chamber confined between the screw and the end of the chamber in a position such as to cover the outlet, said body comprising a solid mass of compressible porous form-sustaining material having sufficient substance to stand without support between said screw and said outlet with at least a substantial portion of the entire length of its side surfaces exposed in said chamber to liquid which has entered said chamber from said inlet, whereby liquid entering said chamber enters side surface portions of said body and leaves said body through its solid end at a rate of flow controlled by the compression of said body.

4. A flow controlling device comprising the combination with a casing provided with an inlet and having an outlet port and an intervening chamber communicating with said inlet and with said outlet port, of an adjusting screw threaded for adjustment respecting said casing and having an end portion positioned in said chamber with its axis substantially aligned with that of said outlet port, together with a generally cylindrical felted fibrous body homogeneously continuous from side to side throughout its cross section and having side wall portions exposed within said chamber and a solid end portion covering said port, said body being compressibly engaged by the end of said screw and being adapted to receive liquid from said chamber substantially throughout the exposed side surface of said body and to discharge such liquid longitudinally into said port at a rate of flow controlled by the compression of said body under said screw.

5. A flow controlling device comprising the combination with a casing having an inlet, an outlet port and conduit means between the inlet and outlet port including a chamber, a screw threaded to said casing and adjustable to and from the outlet port, the end of said screw extending into said chamber and provided with socket means therein, and a porous resiliently compressible body of materially less cross section than said chamber and extending longitudinally of the projected axis of the screw from said port to the socketed end of the screw and having a terminal portion engaged in such socketed screw end to be positioned thereby, said body having a peripheral portion exposed within said chamber and being of substantially homogeneous cross section continuously within said exposed peripheral portion, whereby liquid entering said chamber from said inlet is admitted through the exposed peripheral surface of said body and leaves said body longitudinally through said port at a rate of flow controlled by the compression of said body by said screw.

6. A flow controlling device comprising the combination with a casing having an inlet, an outlet port and conduit means between the inlet and the outlet port including a chamber, of a screw threaded to said casing and having an end portion in the chamber, said screw being adjustable upon its threads to and from said port, and a resiliently compressible porous body confined between the screw and the end of the chamber, the end of said body covering said port and the cross section of said body being at all points substantially uniformly continuous from side to side, said body having peripheral side portions exposed within said chamber to receive liquid therefrom and having sufficient substance to withstand collapse under the pressure of said screw, the cross section of said body being materially less than that of said chamber and the porosity of said body being variable according to the compression exerted thereon by said screw, whereby liquid admitted to said body through the exposed peripheral portions thereof leaves said body longitudinally through said port at a rate of flow controlled by the compression of said body.

LEVI R. SMITH.
RALPH H. YOECKEL.